US011020711B2

(12) United States Patent
Lin et al.

(10) Patent No.: US 11,020,711 B2
(45) Date of Patent: Jun. 1, 2021

(54) NANOSCALE MEMBRANE FOR REMOVING TRACE ORGANIC CONTAMINANTS IN A FLUID AND METHODS OF MAKING AND USING THE SAME

(71) Applicant: UCHICAGO ARGONNE, LLC, Chicago, IL (US)

(72) Inventors: Xiao-Min Lin, Naperville, IL (US); Kun Wu, Naperville, IL (US); Subramanian Sankaranarayanan, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 16/147,534

(22) Filed: Sep. 28, 2018

(65) Prior Publication Data
US 2020/0101425 A1    Apr. 2, 2020

(51) Int. Cl.
| | | |
|---|---|---|
| *B01D 71/02* | (2006.01) | |
| *B01D 69/12* | (2006.01) | |
| *B01D 67/00* | (2006.01) | |
| *B01D 61/08* | (2006.01) | |
| *B82Y 40/00* | (2011.01) | |
| *B82Y 30/00* | (2011.01) | |

(52) U.S. Cl.
CPC ........... *B01D 71/022* (2013.01); *B01D 61/08* (2013.01); *B01D 67/0093* (2013.01); *B01D 69/125* (2013.01); *B01D 2239/0414* (2013.01); *B01D 2257/70* (2013.01); *B01D 2321/168* (2013.01); *B01D 2323/36* (2013.01); *B01D 2323/40* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 4,533,542 A | * | 8/1985 | Buddenbaum | A61K 31/545 424/497 |
| 2006/0057180 A1 | * | 3/2006 | Chilkoti | A61L 27/34 424/422 |
| 2010/0086604 A1 | * | 4/2010 | Stellacci | B01D 15/00 424/489 |

FOREIGN PATENT DOCUMENTS

WO    WO-2018187633 A2 * 10/2018    ......... B01D 39/2051

OTHER PUBLICATIONS

Alsbaiee et al., Rapid removal of organic micropollutants from water by a porous β-cyclodextrin polymer, 529 Nature, 190, 190-196 (2016). (Year: 2016).*
Ceglowski et al., Functionalization of gold-coated carbon nanotubes with self-assembled monolayers of thiolates, 47 J. Mater. Sci., 3463, 3463-3467 (2012). (Year: 2012).*

(Continued)

*Primary Examiner* — Krishnan S Menon
*Assistant Examiner* — Brad Gordon
(74) *Attorney, Agent, or Firm* — Marshall, Gerstein & Borun LLP

(57) ABSTRACT

A membrane for filtering one or more hydrophobic organic contaminants can include a porous nanostructure that includes one or more of a metal, a metal oxide, and a metal alloy nanostructure component functionalized with one or more amphiphilic ligands.

21 Claims, 6 Drawing Sheets

(56) References Cited

OTHER PUBLICATIONS

Alsbaiee et al., Letter Research, Rapid removal of organic micropollutants from water by a porous β-cyclodextrin polymer. Nature vol. 529 pp. 190-206 © 2016 Mcmillan Publishers Limited, Jan. 14, 2016.

Benotti et al., Pharmaceuticals and Endocrine Disrupting Compounds in U.S Drinking Water, Environmental Science & Technology vol. 43. No. 3, 2009, © American Chemical Society, pp. 597-603.

Jobling et al,. Introduction: The Ecological Relevance of Chemically Induced Endocrine Disruption in Wildlife, Monograph, Environmental Health Perspective, vol. 114, Supplement 1, pp. 7-8, Apr. 2006.

Kidd at al., Collapse of a fish population after exposure to a synthetic estrogen, PNAS, vol. 104 No. 21, pp. 8897-8901, May 22, 2017.

Rojas et al., Supported Monolayers Containing Preformed Binding Sites. J. Am. Chem. Soc., 1995, 117, No. 1, pp. 336-343.

Shappell et al., Destruction of Estrogens Using Fe-TAML/Peroxide Catalysis, Environmental Science & Technology, vol. 42, No. 4, 2008, pp. 1296-1300.

He et al., Diffusion and filtration properties of self-assembled gold nanocrystal membranes, Nano Lett., 11(6):2430-5 (Jun. 2011).

He et al., Fabrication and mechanical properties of large-scale freestanding nanoparticle membranes, Small, 6(13):1449-56 (Jul. 2010).

Jiang et al., Subnanometre ligand-shell asymmetry leads to Janus-like nanoparticle membranes, Nat. Mater., 14(9):912-7 (Sep. 2015).

Kanjanaboos et al., Self-assembled nanoparticle drumhead resonators, Nano Lett., 13(5):2158-62 (May 2013).

Mueggenburg et al., Elastic membranes of close-packed nanoparticle arrays, Nat. Mater., 6(9):656-60 (Sep. 2007).

Schwarzenbach et al., The challenge of micropollutants in aquatic systems, Science, 313(5790):1072-7 (Aug. 2006).

Wen et al., Low-pressure flow chemistry of CuAAC click reaction catalyzed by nanoporous AuCu membrane, ACS Appl. Mater. Interfaces, 10:25930-5 (2018).

Zhu et al., Engineering Ordered and Nonordered Porous Noble Metal Nanostructures: Synthesis, Assembly, and Their Applications in Electrochemistry, Chem. Rev., 115(16):8896-943 (Aug. 2015).

\* cited by examiner

NANOSCALE MEMBRANE FOR REMOVING TRACE ORGANIC CONTAMINANTS IN A FLUID AND METHODS OF MAKING AND USING THE SAME

STATEMENT OF GOVERNMENT SUPPORT

This invention was made with government support under grant number DE-AC02-06CH11357 awarded by the Department of Energy. The government has certain rights in the invention.

BACKGROUND

Field of the Disclosure

The disclosure relates to a nanoscale membrane for removing trace organic contaminants in fluid and methods of making and using the same.

Brief Description of Related Technology

Emerging trace organic contaminants in a water supply presents a challenge for water treatment because the existing technologies to remove them are not cost-effective. Trace organic contaminants can come from a variety of sources, including, but not limited to, textile dyes, pharmaceuticals, personal care products, endocrine disrupting compounds, and synthetic fertilizers. It is becoming increasingly clear that many of these compounds have adverse health effects at an environmentally relevant concentration. For example, endocrine disrupting compounds, including natural and synthetic estrogens, can disrupt the normal function of the human endocrine systems. There are several sources of endocrine disrupting compounds found in water, including natural estrogens from oral contraceptives, synthetic estrogens in crop fertilizers (e.g., Atrazine), synthetic and natural estrogens from livestock, and a number of industrial chemicals, such as plastic additive bisphenol-A. The presence of even trace amounts of these highly potent compounds in water has an adverse environmental and health effect on aquatic life, and possibly human health. Recent experimental evidence showed that ethinylestradiol, a main active ingredient in oral contraceptives, can induce feminization of wild male fish even with concentrations as low as parts per trillion and contributes to increased infertility amongst humans.

Conventional water filtration technology to remove trace organic contaminants utilizes either reverse osmosis/nanofiltration membrane technology or activated carbon combined with ozone treatment. These processes can remove a large portion of toxic compounds, but require a high financial cost and large power consumption. It has been estimated that in Europe alone, the financial burden could reach billions of dollars. In addition to being costly, ozone can also create potential toxic byproducts, such as bromate, a possible carcinogen.

Full-functional iron-tetra amino macrocyclic ligand (iron-TAML) catalyst with hydrogen peroxide was recently developed as an alternative strategy, but such catalysts are expensive to produce and subsequent removal of peroxide is difficult, presenting a major obstacle to its application. Shappell et al, Environ. Sci. Technol., 2008, 42 (4), pp 1296-1300. Another recently developed polymer, porous ß-cyclodextrin containing polymer, suffers from potential toxicity problems, as the polymer cross-linker, tetrafluoroterephthalonitrile (TFT) is a known toxic compound and there is no guarantee that it will not leach into the aquatic environment from the polymer containing the ß-cyclodextrin. Alsbaiee, et al, Nature 2016, 529, 190.

SUMMARY

In accordance with embodiments, a membrane for filtering hydrophobic organic contaminants from a fluid can include a porous nanostructure comprising metal-containing nanowires and one or more amphiphilic ligands attached to or assembled on the porous nanostructure. In embodiments, the nanowires can comprise gold. In embodiments, the nanowires can comprise a transition metal. In embodiments, the nanowires can comprise noble metals such as gold and Ag. In embodiments, the nanowires can include one or more transition metals, such as Cu, Fe, and Ni.

In embodiments, the nanowires can comprise gold and the amphiphilic ligand can include a thiolated derivative of cyclodextrin.

In embodiments, the membranes can be reusable. In embodiments, the membranes can be cleaned for reuse with a cleaning solution. In embodiments, the cleaning solution can be or can include a low molecular weight alcohol. For example, the cleaning solution can be or can include one or more of ethanol, isopropanol, and butanol.

In embodiments, the membrane can be disposable. In embodiments the membrane can be used one or more times before reaching the absorption capacity of the membrane before being disposed of.

In accordance with embodiments, a method of making a membrane can include contacting a solution comprising nanowires with a porous substrate under conditions sufficient to dispose the nanowires on top of the porous substrate; drying the nanowires on the porous substrate by applying a vacuum or pressurized air, wherein upon drying the nanowires entangle to form a porous nanostructure disposed on the porous support; and flowing a solution comprising one or more amphiphilic ligands through the nanostructure under conditions sufficient to allow fluid from the solution to flow through the nanostructure and to allow the one or more amphiphilic ligands to self-assemble on the nanowires of the nanostructure.

In accordance with embodiments, a method of making a membrane can include admixing a solution comprising nanowires with a solution comprising one or more amphiphilic ligands, wherein the one or amphiphilic ligands self-assemble onto the nanowires in solution to form functionalized nanowires; contacting the solution comprising functionalized nanowires with a porous substrate under conditions sufficient to dispose the functionalized nanowires on top of the porous substrate; and drying the functionalized nanowires on the porous substrate by applying a vacuum or pressurized air, wherein upon drying the functionalized nanowires entangle to form a porous nanostructure disposed on the porous support.

In accordance with embodiments, a method of filtering a fluid having or suspected of having one or more hydrophobic organic contaminants can include flowing the fluid through a membrane in accordance with any embodiment of the disclosure. In accordance with embodiments, the fluid can be water from a natural aquatic source. In accordance with embodiments, the fluid can be water which has been filtered with a primary filtration system to remove bulk and/or non-organic contaminants. In accordance with embodiments, the fluid can be water which has been filtered by an activated carbon type filter.

DETAILED DESCRIPTION

Figure 1:
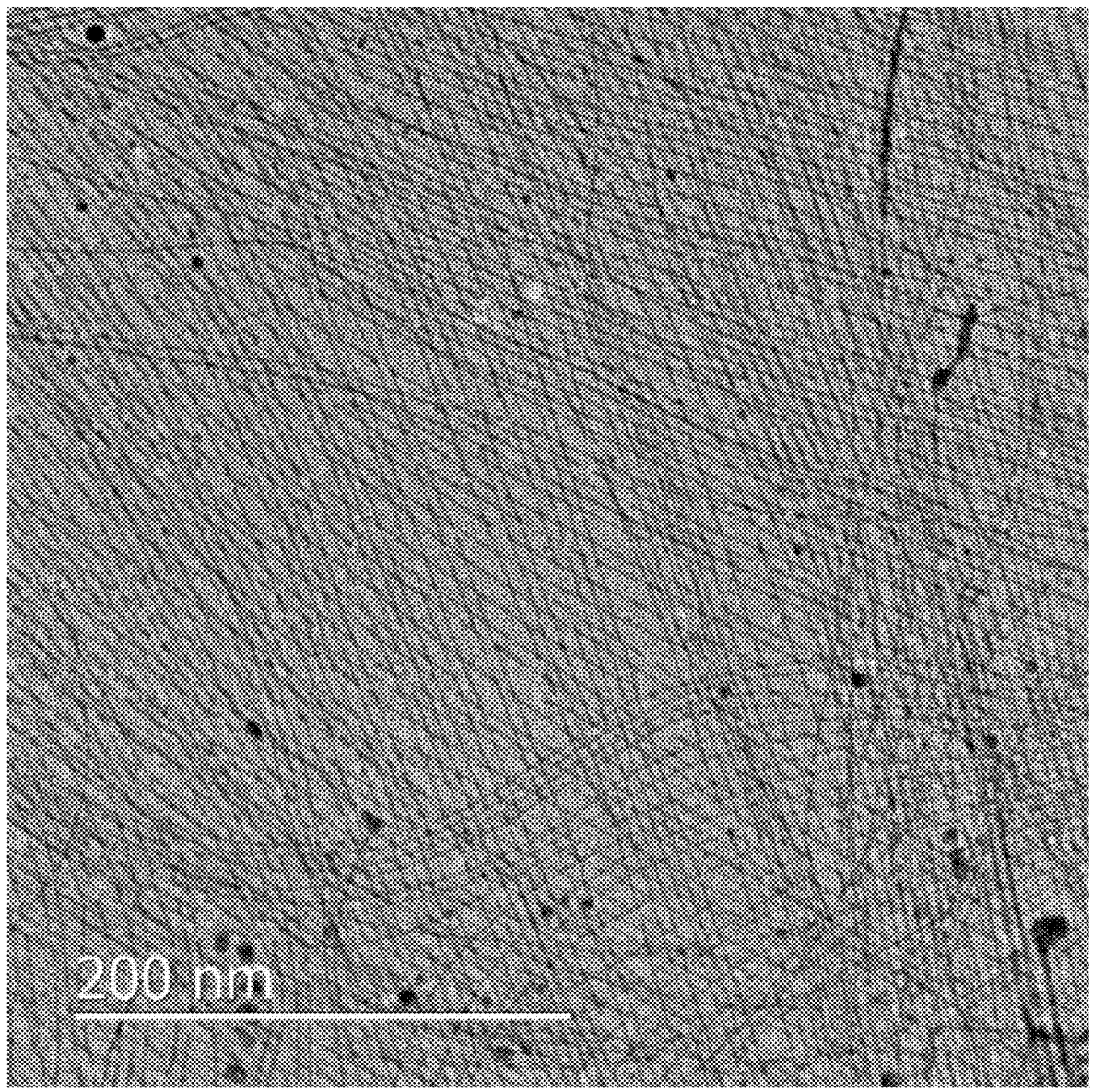
FIG. 1 is a bright field transmission electron microscopy image of gold nanowires in solution.

In accordance with embodiments of the disclosure, a membrane for filtering hydrophobic organic contaminants from a fluid can include a porous nanostructure formed of nanowires and one or more amphiphilic ligands attached to the porous nanostructure membrane. In embodiments, the membrane can include a support upon which the porous nanostructure can be disposed.

In accordance with embodiments, a method for filtering a fluid can include passing the fluid through a membrane in accordance with the disclosure. Organic contaminants can become entrapped by the amphiphilic ligand as the fluid flows through the filter. In accordance with embodiments, the membrane and methods of the disclosure can be used to filter trace organic contaminants from a fluid, for example, water. The method can include flowing the fluid with or without applied pressure.

Without intending to be bound by theory, it is believed that the membranes in accordance with embodiments of the disclosure entrap organic contaminants from a fluid flowing there-through by attraction of hydrophobic contaminants to hydrophobic portions of the ligands attached to the nanowires. It is further believed that the high surface provided by the use of an entangled network of nanowires aids in achieving effective filtration and would allow for filtration of organic contaminants that are present only in trace amounts, as is the case in many typical aquatic systems.

In accordance with embodiments, the porous nanostructure can include nanowires, nanoparticles, nanorods, and/or other nano-sized structures. For ease of reference, the collection of such nano-sized structures which can form the porous nanostructure will be referred to herein as nanostructure components. In various embodiments, the porous nanostructure includes nanowires. In embodiments, the nanowires are entangled into rope-like structures and the rope-like structures are further entangled to form a porous structure.

In accordance with embodiments, the nanostructure can be a metal or metal alloy. For example, the nanostructure can include one or more of gold, copper, silver, iron, nickel, oxides thereof, alloys thereof, and combinations thereof. For example, in embodiments, the nanostructure can include one or more of gold nanowires, gold-copper nanowires, gold-silver nanowires, and gold-iron nanowires. The nanostructure can include other transition metals or transition metal alloys depending, for example, on the application and ligand to be attached.

In accordance with embodiments, the nanowires can have a thickness or an average thickness of about 10 nm to about 100 μm, about 10 nm to about 100 nm, about 10 nm to about 50 nm, about 1 μm to about 100 μm, about 1 μm to about 10 μm, about 15 μm to about 45 μm, about 20 μm to about 80 μm, about 100 nm to about 1000 nm, about 200 nm to about 500 nm, and about 400 nm to about 750 nm. Other suitable thicknesses can include about 10 nm, 20 nm, 30 nm, 40 nm, 50 nm, 60 nm, 70 nm, 80 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 900 nm, 925 nm, 950 nm, 975 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75, μm, 80 μm, 85, μm, 90 μm, 95 μm, and 100 μm.

Without intending to be bound by theory, it is believed that the amount by weight of nanostructure component in the nanostructure correlates to the absorption capacity of the membrane. The amount by weight of nanostructure component in the nanostructure correlates to the amount by weight of metal, metal alloy, and/or metal oxide present. That is, the inventors have found that increasing the amount by weight of the metal or metal alloy present in the membrane increases the absorption capacity of the membrane. For example, the porous nanostructure can include about 1 mg to about 1 kg of nanostructure component, depending upon the volume and flow rate requirement of specific applications. For example, the membrane can include 1 mg to 1 kg of nanowires.

The amount by weight of the metal or metal alloy can be adjusted by increasing or decreasing the size of the porous nanostructure. This can be controlled through control of the thickness of the nanostructure and/or the overall diameter of the nanostructure. For example, for a fixed diameter membrane, the absorption capacity can be adjusted by increasing or decreasing the thickness of the nanostructure. Depending on the application, the thickness of the nanostructure can range from tens of nanometers to macroscopic or even meter sized dimensions for large-scale industrial filtration. This advantageously provides a membrane that can be tailored for a variety of applications including industrial filtration and home filtration. For example, for household use, the membranes in accordance with embodiments of the disclosure can be used as portable filters, for example, for pitchers, or could be used as in-line filters in appliances, such as in a refrigerator. It is also contemplated herein, that the membranes can be used in whole-house filtration. Industrial applications can include treatment at waste water facilities, treatment of waste water at manufacturing facilities. Any other uses in which filtration of trace organic contaminants are also contemplated herein.

In embodiments, the nanostructure can include nanowires. The nanowires can be formed in accordance with known methods in the art. For example, the nanowires can be made in solution. For example, a gold nanowires can be formed in solution by mixing gold chloride trihydrate ($HAuCl_4.3H_2O$) with a solvent and an oleylamine. The solvent can be for example hexane. In embodiments, the gold salt solution can be combined with hexane and triisopropylsilane (TIPS) to form nanowires. Other known methods of making nanostructures can be used in the embodiments of the disclosure.

In various embodiments, the membrane can include a porous substrate upon which the nanostructure rests or is disposed. Various porous substrates can be used including, but not limited to, one or more of cellulose and chitosan based filters, polycarbonate filters, active carbon filter, ceramic filter, polysulfone filter and polyamide filter.

In accordance with embodiments, the amphiphilic ligand can be a cyclodextrin or cyclodextrin derivate. For example, the ligand can be a cyclodextrin derivative having a thiol group, which thereby allows the cyclodextrin derivative self-assembly onto a gold or gold-alloy containing porous nanostructure. For example, in embodiments, a cyclodextrin derivative having a thiol group can be dissolved in a solvent and the solution can be filtered through the nanostructure, thereby allowing the cyclodextrin derivative to spontaneously attach to the nanostructure via the thiol group. In embodiments, the cyclodextrin derivative can be dissolved in ethanol. The cyclodextrin derivative having the thiol group can be any one or more of a thiolated derivative of α-cyclodextrin, a thiolated derivative of ß-cyclodextrin, and thiolated derivative of γ-cyclodextrin. Any known methods of modifying a cyclodextrin or cyclodextrin derivative to include a thiol group can be used. In embodiments, the amphiphilic ligand can be per-6-thiol-β-cyclodextrin. Other amphiphilic ligands are also contemplated herein. For example, the amphiphilic ligand can have a linear amphiphilic chain comprising a hydrophobic alkane segment connected with a hydrophilic polyethylene glycol segment. For example, the amphiphilic ligand can be amphiphilic dendrimers comprised of an inner hydrophobic region and outer hydrophilic region. In embodiments, the amphiphilic ligand can be amphiphilic dendrimers comprised of an inner hydrophobic region and outer hydrophilic region.

Advantageously, membranes in accordance with the disclosure can allow for the use of a cyclodextrin or cyclodextrin derivative organic contaminant capture agent that does not suffer from the potential toxicity problems of conventional polymers containing a cyclodextrin. The nanostructures in accordance with the disclosure are stable and do not have associated leaching problems found with conventional polymer filters. In accordance with embodiments, the components of the nanostructure, both the metal/metal alloy core and ligand are biocompatible.

In accordance with embodiments, nanostructures functionalized with an amphiphilic ligand can have an average pore size in a range about 1 nm to about 100 nm, about 1 nm to 10 nm, about 50 nm to about 100 nm, about 20 nm to about 80 nm, about 15 nm to about 75 nm, about 70 nm to about 100 nm, about 30 nm to about 50 nm, and about 10 nm to about 65 nm. Other suitable average pore sizes include about 1, 2, 3, 4, 5, 6, 7, 8, 9, 10, 15, 20, 25, 30, 35, 40, 45, 50, 55, 60, 65, 70, 75, 80, 85, 90, 95, and 100 nm.

In accordance with embodiments, a method of making the membrane can include forming the nanostructure component in solution, applying the solution to a porous substrate, and drying the nanostructure component on the porous substrate. For example, drying can be accomplished by using a vacuum to filter through the fluid of the nanostructure component solution. In embodiments, nanowires are prepared in solution and applied to a porous substrate. The fluid of the nanowire solution can be pulled through the porous substrate using a vacuum or other applied pressure, thereby drying the nanowires. Upon drying, the nanowires can become entangled into rope like structures and further entanglement of the rope like structures can occur to provide a porous nanostructure that interacts with a fluid as it passes through the nanostructure.

In embodiments, the method can include pouring a solution containing a nanostructure component in the solution and applying an agent to induce precipitation of the nanostructure component from the solution. For example, ethanol can be used to induce precipitation of a gold containing nanostructure component from a solution.

In embodiments, the method can include depositing a solution of nanostructures onto an immiscible liquid, and allowing a nanostructure to self-assemble to form a sheet at the liquid-liquid interface or upon solvent evaporation form a sheet at the liquid-air interface. The membrane thus formed can be transferred to other suitable supports using, for example, Langmuir trough deposition techniques.

In accordance with embodiments, the nanostructure component can be functionalized with the amphiphilic ligand(s) before the components are assembled into the nanostructure. In such embodiments, the method can include applying a solution containing functionalized nanostructure component to a porous substrate and drying under applied pressure or vacuum.

In accordance with alternative embodiments, the nanostructure can be functionalized with the amphiphilic ligand after the nanostructure is formed. For example, a solution containing the amphiphilic ligand can be applied to the nanostructure and allowed to flow through with or without applied pressure. Upon flowing through the nanostructure the amphiphilic ligand can spontaneously assembly onto the nanostructure. For example, in an embodiment, a solution containing a thiol modified cyclodextrin derivative can be flowed through a gold or gold-alloy nanowire nanostructure with an applied vacuum. As the solution contacts the nanowires of the nanostructure, the cyclodextrin through an interaction between the thiol group and gold can assembly onto the nanowires.

In accordance with embodiments, methods of filtering a fluid having one or more contaminants include flowing the fluid through a membrane in accordance with the disclosure. The method can include flowing the fluid through the membrane with or without applied pressure. In embodiments, the method of filtering fluid can include filtering a volume of fluid through a membrane prior to cleaning or disposing of the membrane.

In embodiments, the fluid can be water from a typical aquatic source, such as source water, finished water from water treatment facilities, the distributed water at consumer site, and/or laboratory grade water (Types 1-3) from portable source. In embodiments, the fluid can be pre-filtered to remove other contaminants prior to filtering using a membrane in accordance with the disclosure. In embodiments, the membrane can be used in line with and downstream of an activated carbon filter.

In accordance with embodiments, the membrane can be disposable and can be disposed of after reaching its contaminant absorption capacity. The amount of fluid that can be filtered prior to disposing the filter can depend on the size of the filter, and/or the amount of contaminants in the fluid. In embodiments, a filter having 2 mg of gold nanomaterial can have the capability to filter 1000 L of water from a typical aquatic source and remove trace organic contaminants present at part per trillion level. The membrane size can be adjusted depending on the filtration application and the desired contaminant absorption capacity.

Figure 5:
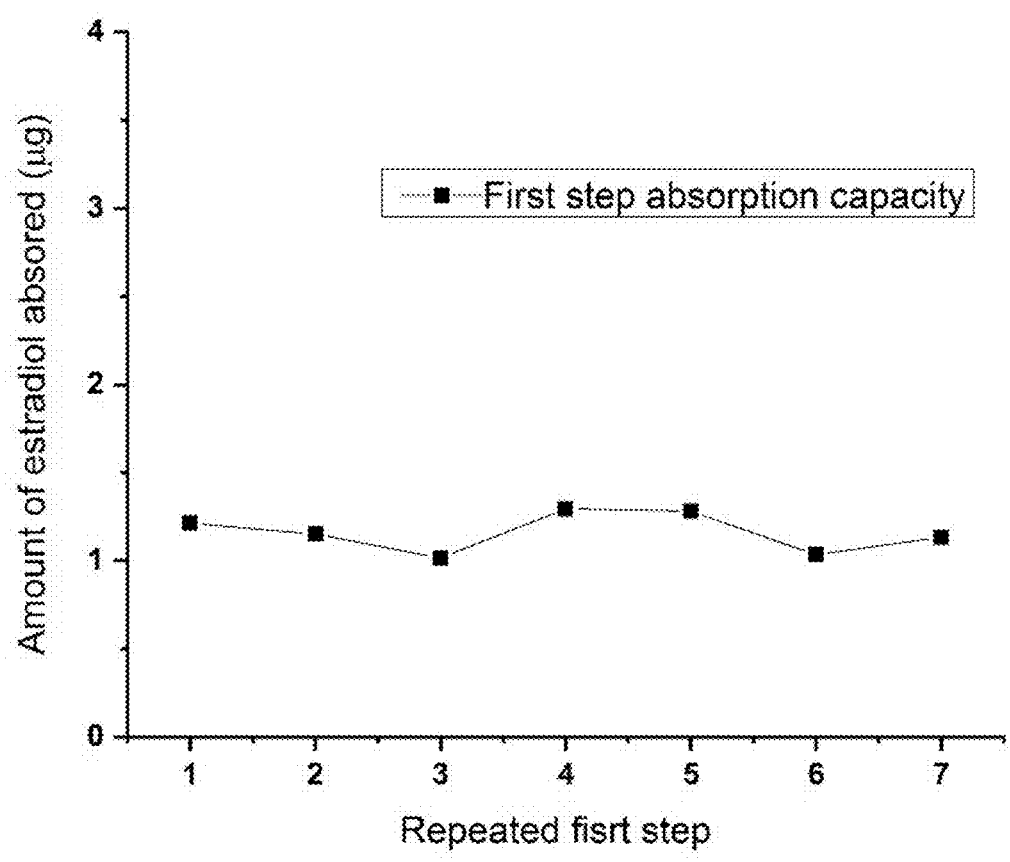
FIG. 5 is a graph showing absorption of estradiol with a membrane in accordance with an embodiment of the disclosure having 2 mg of gold nanowire functionalized with Per-6-thiol-β-cyclodextrin, illustrating the reusability and consistent absorption performance of the membrane after cleaning with ethanol to remove bound contaminant.

In embodiments, the membrane can be a reusable membrane. In embodiments, the membrane can be cleaned for subsequent use. For example, a solvent capable of unbinding the captured contaminant can be used to clean the membrane. For example, in an embodiment the membrane can be cleaned with alcohol to remove bound contaminant to allow the membrane to be used for further filtration after the initial absorption capacity is reached. In embodiments, the cleaning solution can be or can include a low molecular weight alcohol. For example, the cleaning solution can be or can include one or more of ethanol, isopropanol, and butanol. As illustrated in FIG. 5, a membrane in accordance with the disclosure can maintain substantially the same initial absorption capacity after repeated washing of the membrane and filtering of a fluid.

Membranes in accordance with embodiments of the disclosure can be used in a variety of applications from large-scale filtration, such as water treatment plants, to smaller-scale, home filtration. The size of the membranes, including the amount of nanomaterial present in the membrane can be adjusted depending on the intended application. In some embodiments, membranes in accordance with the disclosure can be used after primary filters, such as activated carbon filters and other such filters.

Various contaminants can be removed or filtered from a fluid using membranes and methods in accordance with embodiments of the disclosure. For example, the membranes and methods in accordance with embodiments of the disclosure can be used to reduce the concentration and/or entirely remove from a fluid any one or more of pharmaceutical drug contaminants, endocrine disrupting compounds (EDCs) and other unregulated organic contaminants. Many such contaminants can have low water solubility and can be present in trace amounts in typical aquatic systems. For example, the membrane can be used to remove a natural estrogen compound 17β-estradiol (E2) from a fluid, such as water. E2 belong to a broad class of so-called endocrine disrupting compounds (EDCs) which also include synthetic estrogen used in birth-control pills [17α-ethynylestradiol (EE2)], or weaker estrogen mimics such as nonylphenol. These compounds exist in aquatic system at low concentration, typically at part per trillion level. But their estrogenic potency is significant. Scientific evidence exists that they could impact the reproductive function of many aquatic species and lead to an increase of certain diseases in human endocrine system (Susan Jobling and Charles R. Tyler, Environ. Health Perspectives, 114, 7-8, (2006); Karen A. Kidd et al. PNAS, 104, 8897-8901, (2007)). Table 1 below provides a listing of various contaminants that are commonly found in US water utilities, and can be filtered from a fluid in accordance with embodiments of the disclosure. Benotti et al. Environ. Sc. Technol. 2009, 43, 597-603.

TABLE 1

| Contaminant | CAS Number | Description |
| --- | --- | --- |
| Pharmaceutical | | |
| atenolol | 29122-68-7 | beta-blocker |
| atorvastatin | 134523-03-8 | antilipidemic |
| carbamazepine | 298-46-4 | anticonvulsant |
| diazepam | 62-73-7 | antianxiety |

TABLE 1-continued

| Contaminant | CAS Number | Description |
| --- | --- | --- |
| diclofenac | 15307-79-6 | nonsteroidal anti-inflammatory |
| enalapril | 76095-16-14 | Angiotensin-converting enzyme inhibitor |
| fluoxetine | 59333-67-4 | antidepressant |
| gemfibrozil | 25812-30-0 | antilipidemic |
| o-hydroxy atorvastatin | 214217-86-6 | metabolite of atorvastatin |
| p-hydroxy atorvastatin | 214217-88-6 | metabolite of atorvastatin |
| meprobamate | 57-53-4 | antianxiety |
| naproxen | 2204-53-1 | nonsteroidal anti-inflammatory |
| norfluoxetine | 83891-03-6 | metabolite of fluoxetine |
| phenytoin | 57-41-0 | anticonvulsant |
| risperidone | 106266-06-02 | anti-psychotic |
| simvastatin | 79902-63-9 | antilipidemic |
| simvastatin hydroxy acid | 12009-77-6 | metabolite of simvastatin |
| sulfamethoxazole | 723-46-6 | antibiotic |
| triclosan | 3380-34-5 | antibacterial/antimicrobial |
| trimethoprim | 738-70-5 | antibiotic |
| Known or Potential EDCs | | |
| atrazine | 1912-24-9 | herbicide |
| benzophenone | 119-61-9 | UV stabilizer |
| butylated hydroxy anisole (BHA) | 25013-16-5 | food preservative |
| 17β-estradiol | 50-28-2 | steroid hormone |
| estrone | 53-16-7 | steroid hormone |
| 17α-ethynylestradiol | 57-63-6 | synthetic steroid hormone |
| bisphenol A | 80-05-7 | component of plastics |
| butylbenzyl phthalate | 85-68-7 | plasticizer |
| diazinon | 333-41-5 | insecticide |
| diethylhexyl phthalate | 117-81-7 | plasticizer |
| galaoxlide (HHCB) | 1222-05-5 | fragrance |
| β-hexachlorocyclohexane (β-HCH) | 319-85-7 | insecticide constituent |
| α-hexachlorocyclohexane (α-HCH) | 319-84-6 | insecticide constituent |
| γ-hexachlorocyclohexane (γ-HCH) | 58-89-9 | insecticide |
| δ-hexachlorocyclohexane (δ-HCH) | 319-86-8 | insecticide constituent |
| linuron | 330-55-2 | herbicide |
| methoxychlor | 72-43-5 | insecticide |
| musk ketone | 81-14-1 | fragrance |
| nonylphenol | 104-40-7 | nonionic surfactant degradation product |
| octachlorostyrene | 29082-74-4 | pesticide |
| octylphenol | 27193-28-8 | surfactant degradate |
| progesterone | 57-83-0 | steroid hormone |
| testosterone | 58-22-0 | steroid hormone |
| tonalide (AHTN) | 108-88-3 | fragrance |
| vinclozolin | 50471-44-8 | fungicide |
| Other Chemicals | | |
| butylated hydroxy toluene (BHT) | 128-37-0 | food preservative |
| metolachlor | 51218-45-2 | herbicide |
| n,n-diethyl-meta-toluamide (DEET) | 134-62-3 | insect repellant |
| traseolide (AITI) | 68140-48-7 | fragrance |
| tris(2-chloroethyl) phosphate (TCEP) | 115-96-8 | flame retardant |
| tris(1,3-dichloro-2-propyl) phosphate (TCPP) | 13674-84-5 | flame retardant |

Example

Nanowires were formed by mixing 1 ml oleylamine with 30 mg of gold chloride trihydrate (HAuCl$_4$.3H$_2$O) in 25 ml of hexane, followed by adding 1.5 ml of triisopropylsilane (TIPS). The reaction was allowed to be carried out overnight without stirring. A dark brown red solution was obtained.

Referring to FIG. 1, a TEM image show the obtained gold nanowires having a diameter of approximately 1.5 nm and a length exceeding 1 μm.

Figure 2:
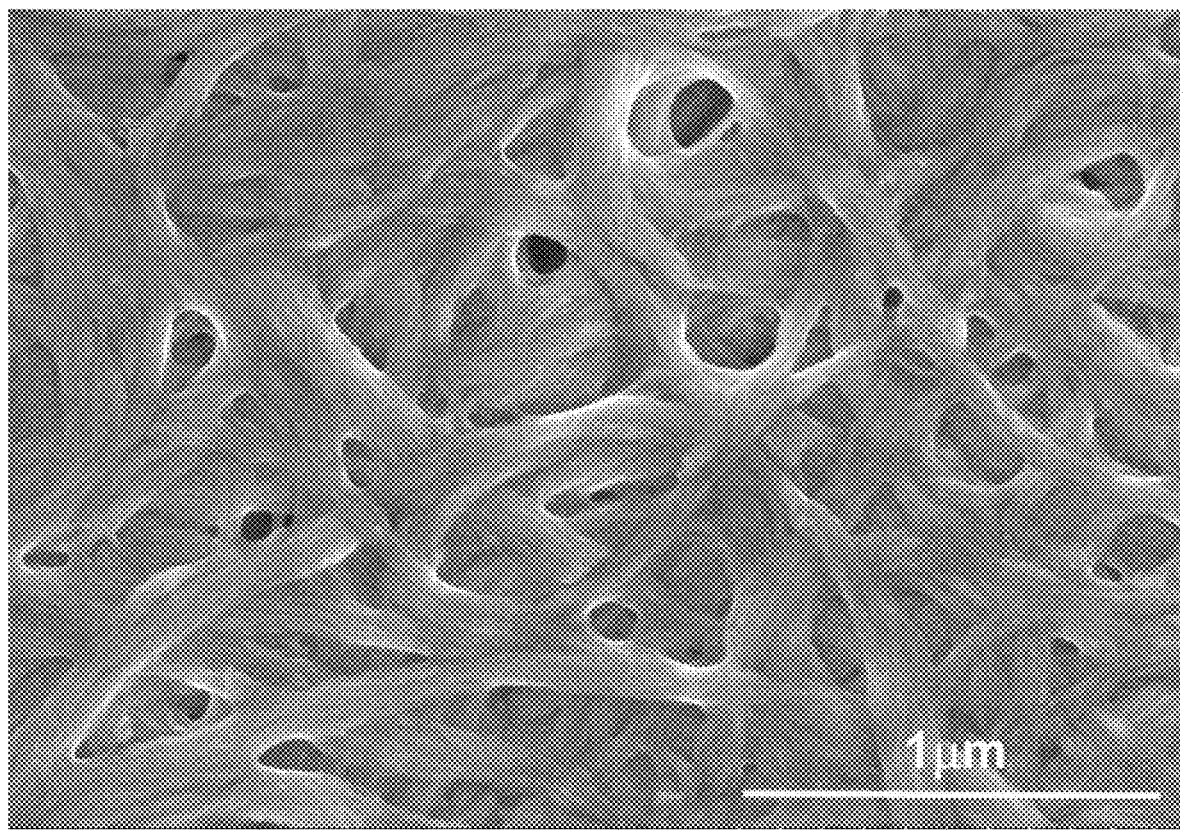
FIG. 2 is a scanning electron microscopy image of a nanostructure having gold nanowires in accordance with an embodiment of the disclosure.

4 mL of the as-prepared gold nanowire hexane solution was added to a filter flask of a 25 mm EMD vacuum filter device. 8 ml of ethanol was then added. Nanowires slowly precipitated after 5 to 10 minutes and were deposited onto a commercial polycarbonate filter (Milipore Isopore HTTP membrane, 25 mm, 0.4 μm pore) sandwiched between the filter flask and the bottom filter vase. A house vacuum was applied on the base of the filtering unit to draw the liquid through the membrane, thereby drying the nanowire structure deposited on the polycarbonate filter. The membrane filter was subsequently washed by filtering 15 ml of ethanol and 30 ml of water consecutively through the membrane. The nanowire membrane filter was estimated to contain about 2 mg of gold. Referring to FIG. 2, a scanning electron microscopy study showed that the gold nanowires bundled into rope-like structures and became highly entangled.

Per-6-thiol-β-cyclodextrin ligand was synthesized according to the procedure outlined by Maria T. Rojas et al. (J. Am. Chem. Soc. 117, 336-343, (1995)). 15 mL of 0.1 mM thiolate β-cyclodextrin derivative in ethanol was slowly filtrated through the nanowire membrane under gravitation to functionalize the gold nanowire surface. The membrane was subsequently washed with 15 mL of ethanol and 60 mL of water sequentially to remove unbound ligand.

Figure 3A:
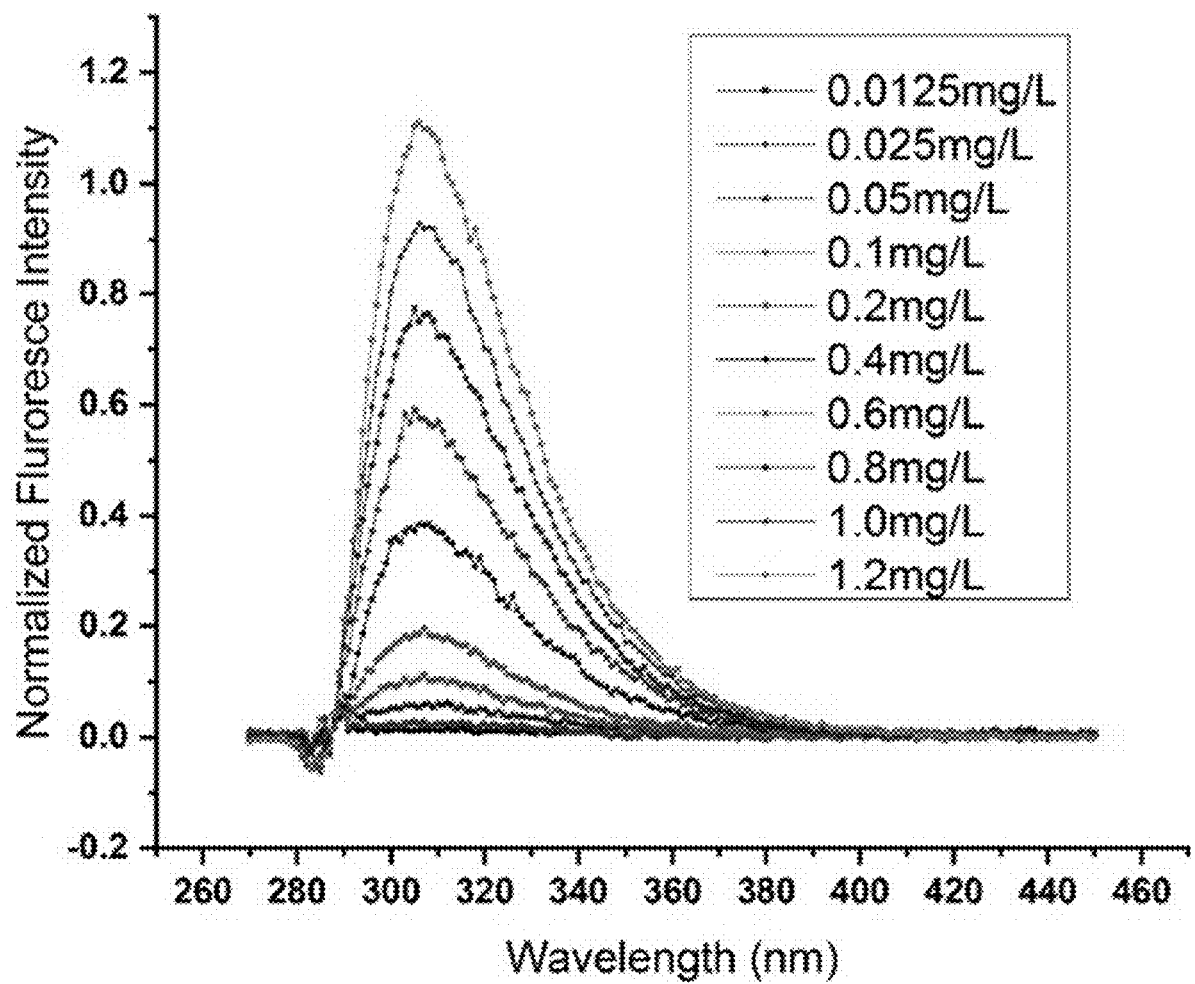
FIG. 3A is a normalized fluorescence intensity of 17β-estradiol (E2) in water at various concentrations. The data was obtained by a 260 nm UV excitation, normalized with a Raman peak of water at 287 nm. The Raman peak of water was subtracted from the data.
Figure 3B:
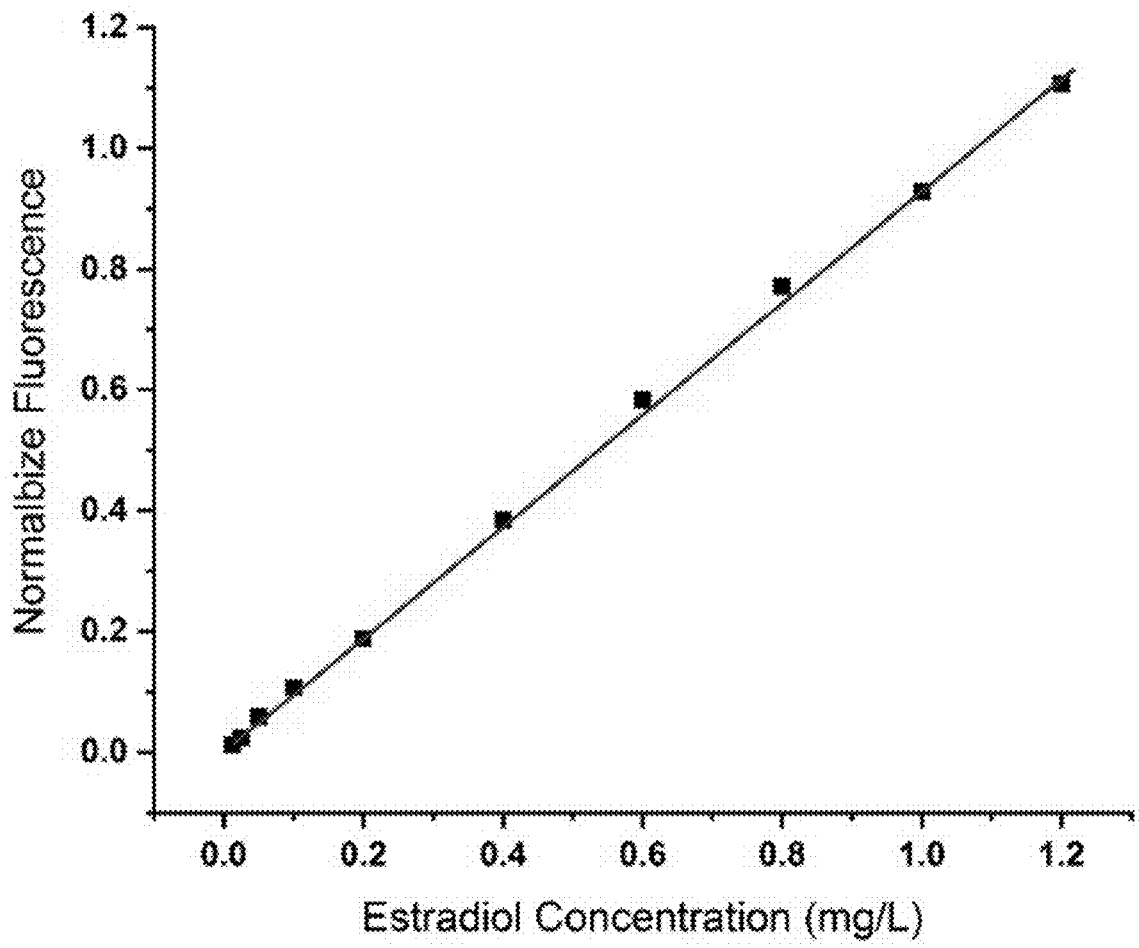
FIG. 3B is a graph of normalized fluorescence intensity verses estradiol concentration.

The absorption of a natural estrogen compound 17ß-estradiol (E2) in water was tested using the membrane. Testing was done using higher concentrations (mg/L) of E2 than would be anticipated in typical aquatic systems (ng/L). Referring to FIG. 3A, calibration curves with E2 concentration within the range of 12.5 μg/L to 1.2 mg/L were first measured using a John Yvon Horiba Nanolog Spectrofluorimeter. The excitation wavelength was set to 260 nm, and the Raman peak of water at 278 nm was used to normalize the intensity of the measured spectra. The normalized fluorescence intensity at various concentrations are shown in FIG. 3B.

Figure 4:
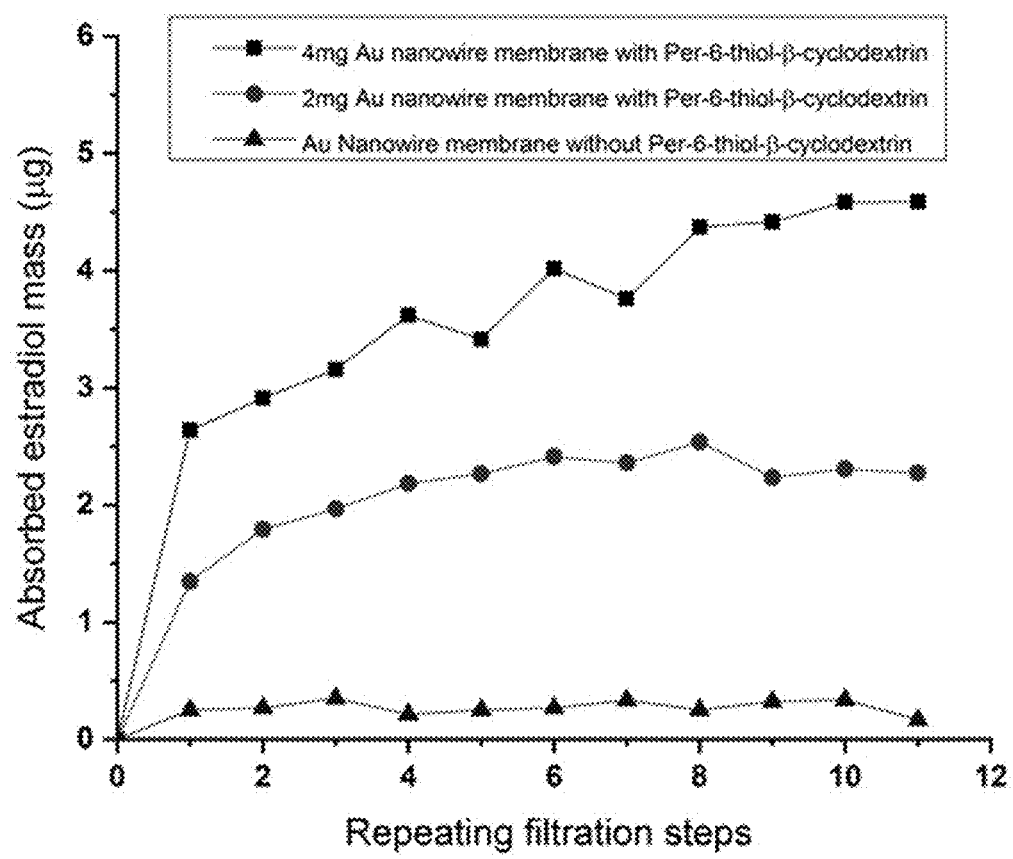
FIG. 4 is a graph showing the absorption characteristics of gold nanowire membrane functionalized with Per-6-thiol-β-cyclodextrin in accordance with the embodiments of the disclosure at different amounts of gold nanowire (circle and square labeled curves) and of a membrane having gold nanowires without functionalization with an amphiphilic ligand (triangle labeled curve)

Absorption of E2 by the membrane was tested by applying 15 ml of as solution of 1.2 mg/L E2 in water to the membrane and applying a house vacuum. The flow rate of the membrane was approximately 7 ml/min. The collected filtrate was measured to determine the concentration of E2 and then used as a subsequent solution input for a further filtration step. Referring to FIG. 4, the membrane made of 2 mg gold nanowire had an absorption capacity of 2 μg of E2.

The relationship between the amount of gold nanowire present and absorption capacity of the membrane was tested by forming a membrane as described above, but having 4 mg of gold nanowire. As illustrated in FIG. 4, it was found that the absorption capacity nearly doubled when the amount of gold was similarly doubled.

FIG. 4 further illustrates that the presence of the per-6-thiol-β-cyclodextrin ligand significantly increased the absorption capacity as compared to a membrane having a gold nanowire that was not functionalized with a ligand.

The capacity of the membrane to handle subsequent filtration steps was also tested by applying filtration solution to the membrane for a repeated number of times. As illustrated in FIG. 4, the membrane has the largest absorption capacity upon the initial filtration cycle, but maintained the ability to perform some additional absorption of the E2 even after multiple cycles, without cleaning of the membrane between cycles.

Finally, the reusability of the membrane was tested. The membrane was subjected to a filtration step as described above, using 15 ml of 1.2 mg/L E2 in water, flowed through the membrane under house vacuum. The concentration of E2 in the filtrate was measured to determine the amount of absorption by the filter. After the initial filtration step, the membrane was rinsed with ethanol to remove any captured E2 and subject to a further filtration cycle. As illustrated in FIG. 5, the membrane was capable of maintaining consistent absorption capacity after each ethanol washing step, demonstrating that the membrane is capable of washing and reuse.

The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A membrane for filtering one or more hydrophobic organic contaminants from an aqueous fluid as the aqueous fluid is flowed through the membrane comprising:
   a porous nanostructure formed of metal-containing nanowires; and
   one or more thiol modified cyclodextrins attached to or assembled on the porous nanostructure thereby functionalizing the porous nanostructure, wherein the one or more thiol modified cyclodextrins have an inner hydrophobic region and an outer hydrophilic region, the one or more thiol modified cyclodextrins are arranged on the porous nanostructure such that aqueous fluid can flow through the membrane and the one or more hydrophobic organic contaminants are attracted to the inner hydrophobic region of the one or more thiol modified cyclodextrins, and the membrane is configured to absorb one or more hydrophobic contaminants from an aqueous flow through attraction of the one or more hydrophobic contaminants to the inner hydrophobic region while the aqueous fluid flows through the membrane.

2. The membrane of claim 1, wherein the one or more thiol modified cyclodextrins is per-6-thiol-ß-cyclodextrin.

3. The membrane of claim 2, wherein the metal-containing nanowires comprise gold nanowires.

4. The membrane of claim 1, wherein the one or more thiol modified cyclodextrins comprises thiol modified α-cyclodextrin, thiol modified ß-cyclodextrin, and/or thiol modified γ-cyclodextrin.

5. The membrane of claim 1, wherein the metal-containing nanowires comprises a gold alloy selected from the group consisting of gold-copper alloys, gold-silver alloys, gold-iron alloys, and oxides and combinations thereof.

6. The membrane of claim 1, wherein the metal-containing nanowires comprise one or more of gold, copper, silver, iron, nickel, alloys thereof, and oxides thereof.

7. A method of making the membrane claim 1 for filtering one or more organic contaminants from a fluid comprising:
contacting a solution comprising metal-containing nanowires with a porous substrate under conditions sufficient to dispose the nanowires on top of the porous substrate;
drying the nanowires on the porous substrate by applying a vacuum or pressurized air, wherein upon drying the nanowires entangle to form a porous nanostructure disposed on the porous support; and
functionalizing the nanowires by contacting the nanowires with a solution comprising one or more thiol modified cyclodextrins, wherein the one or more thiol modified cyclodextrins self-assemble onto the nanowires in solution to form functionalized nanowires.

8. The method of claim 7, wherein functionalizing the nanowires comprises flowing the solution comprising the one or more thiol modified cyclodextrins through the porous nanostructure under conditions sufficient to allow the one or more thiol modified cyclodextrins to self-assemble on the nanowires of the nanostructure.

9. The method of claim 7, wherein functionalizing the nanowires comprises admixing the solution of nanowires with the solution comprising the one or more thiol modified cyclodextrins under conditions sufficient to allow the one or more thiol modified cyclodextrins to self-assemble on the nanowires, wherein the nanowires are functionalized prior to forming the porous nanostructure.

10. The method of claim 7, wherein the one or more thiol modified cyclodextrins is per-6-thiol-ß-cyclodextrin.

11. The method of claim 7 further comprising contacting the porous substrate with a solvent after the porous substrate is contacted with the solution comprising the nanowires to thereby precipitate the nanowires from the solution onto the porous substrate.

12. The method claim 7, wherein the metal-containing nanowires comprise a transition metal, a transition metal alloy, a transition metal oxides, and combinations thereof.

13. The method of claim 7, wherein the metal-containing nanowires comprise one or more of gold, copper, silver, iron, nickel, alloys thereof, and oxides thereof.

14. A method of making the membrane of claim 1 for filtering one or more organic contaminants from a fluid comprising:
depositing a solution of metal-containing nanowires onto an immiscible liquid, under conditions sufficient to allow the nanowires to self-assemble into a sheet-like porous nanostructure at a liquid-liquid interface or upon solvent evaporation at a liquid-air interface;
transferring the sheet-like nanostructure to a porous support; and
functionalizing the nanowires by contacting the nanowires with a solution comprising the one or more amphiphilic ligands, wherein the one or more amphiphilic ligands self-assemble onto the nanowires in solution to form functionalized nanowires.

15. A method of filtering a fluid using the membrane of claim 1, comprising flowing water containing or suspected of containing one or more hydrophobic organic contaminants through the membrane, wherein as the water flows through the nanostructure, hydrophobic organic contaminants are trapped by a hydrophobic region of the one or more thiol modified cyclodextrins.

16. The method of claim 15, wherein the hydrophobic organic contaminant is an estradiol.

17. The method of claim 15, further comprising cleaning the membrane by flowing through a cleaning solution that removes hydrophobic contaminants trapped in the hydrophobic region of the one or more thiol modified cyclodextrins.

18. A membrane for filtering one or more hydrophobic organic contaminants from an aqueous fluid flowing through the membrane, comprising:
a porous nanostructure formed of metal-containing nanowires, wherein the metal-containing nanowires are noble metal nanowires and/or transition metal nanowires; and
amphiphilic ligands attached to or assembled on the porous nanostructure, wherein the amphiphilic ligands have a hydrophobic portion and a hydrophilic portion and are attached to or assembled on the porous nanostructure such that the hydrophobic portion is an inner region of the amphiphilic ligand and the hydrophilic portion is an outer region of the amphiphilic ligand, thereby functionalizing the porous nanostructure to be adapted for flow-through of the aqueous fluid and attraction of the one or more hydrophobic contaminants to the inner hydrophobic portion from the aqueous fluid, such that the membrane is configured to absorb the one or more hydrophobic contaminants from the aqueous fluid during the flow through of the aqueous fluid through the membrane.

19. The membrane of claim 18, wherein the amphiphilic ligands are dendrimers that have an inner hydrophobic region and an outer hydrophilic polyethylene glycol region, or
the amphiphilic ligands have a hydrophobic alkane segment connected with a hydrophilic polyethylene glycol segment.

20. The membrane of claim 18, wherein the membrane is adapted to allow flow of an aqueous fluid through the membrane without externally applied pressure.

21. The membrane of claim 18, wherein the hydrophilic portion is polyethylene glycol.

* * * * *